(12) United States Patent
Stuck et al.

(10) Patent No.: US 12,479,289 B2
(45) Date of Patent: Nov. 25, 2025

(54) SELF-SEALING COATING FOR FUEL TANKS

(71) Applicant: Hutchinson S.A., Paris (FR)

(72) Inventors: Larry W. Stuck, Amherst, NY (US); Colin G. Vogel, Cheektowaga, NY (US); Flavien P. Montange, Langhorne, PA (US); Daniel T. Bruder, Mercerville, NJ (US)

(73) Assignee: Hutchinson S.A., Paris (FR)

( * ) Notice: Subject to any disclaimer, the term of this patent is extended or adjusted under 35 U.S.C. 154(b) by 61 days.

(21) Appl. No.: 18/613,770

(22) Filed: Mar. 22, 2024

(65) Prior Publication Data

US 2024/0262184 A1 Aug. 8, 2024

Related U.S. Application Data

(63) Continuation of application No. 17/738,670, filed on May 6, 2022, now Pat. No. 11,964,553.
(Continued)

(51) Int. Cl.
| | |
|---|---|
| *B60K 15/03* | (2006.01) |
| *B05D 7/00* | (2006.01) |
| *B05D 7/22* | (2006.01) |
| *C09D 5/00* | (2006.01) |
| *C09D 5/02* | (2006.01) |

(Continued)

(52) U.S. Cl.
CPC ........ *B60K 15/03177* (2013.01); *B05D 7/227* (2013.01); *B05D 7/586* (2013.01); *C09D 5/002* (2013.01); *C09D 5/021* (2013.01); *C09D 5/022* (2013.01); *C09D 7/43* (2018.01); *B05B 13/069* (2013.01); *B60K 2015/03046* (2013.01);
(Continued)

(58) Field of Classification Search
CPC .... B60K 15/03177; B60K 2015/03447; B60K 2015/03493; B60K 2015/03486; B60K 2015/03046; B60K 2015/03032; C09D 7/44; C09D 7/43; C09D 7/42; C09D 5/008; C09D 5/002; C09D 5/021; C09D 5/022; B05D 7/227; B05D 7/586; B05B 13/069
USPC .. 220/560.02, 560.01, 562, 4.13, 4.12, 4.14, 220/62.22, 62.15, 62.11
See application file for complete search history.

(56) References Cited

U.S. PATENT DOCUMENTS

| | | |
|---|---|---|
| 2,406,679 A | 8/1946 | Gray et al. |
| 2,439,366 A | 4/1948 | McLaughlin |

(Continued)

FOREIGN PATENT DOCUMENTS

| | | |
|---|---|---|
| CN | 100551733 C | 10/2009 |
| CN | 102459857 B | 9/2013 |

(Continued)

OTHER PUBLICATIONS

Mei et al., "The Dunlop Process in Natural Rubber Latex Foam", Rubber Technology Developments, 2010, pp. 23-26, vol. 10:2.

*Primary Examiner* — Robert J Hicks
(74) *Attorney, Agent, or Firm* — The Webb Law Firm

(57) ABSTRACT

A method of forming a self-sealing fuel tank includes: providing a container including internal surfaces and external surfaces and configured to hold a fuel; forming a latex coating layer over at least a portion of the internal surfaces and/or external surfaces; depositing or encapsulating an environmental layer over at least a portion of the latex coating layer; where the latex coating layer swells when contacted with the fuel; and where the latex coating layer is (Continued)

formed from a latex coating composition that is substantially free of a non-ionic associative thickener.

20 Claims, 5 Drawing Sheets

Related U.S. Application Data

(60) Provisional application No. 63/185,437, filed on May 7, 2021.

(51) Int. Cl.
*C09D 7/43* (2018.01)
*B05B 13/06* (2006.01)

(52) U.S. Cl.
CPC .............. *B60K 2015/03447* (2013.01); *B60K 2015/03486* (2013.01)

(56) References Cited

U.S. PATENT DOCUMENTS

| | | |
|---|---|---|
| 2,440,965 A | 5/1948 | Merrill et al. |
| 2,446,811 A | 8/1948 | Crawford |
| 2,446,815 A | 8/1948 | Davies et al. |
| 2,715,085 A | 8/1955 | Boger |
| 3,509,016 A | 4/1970 | Underwood et al. |
| 3,563,846 A | 2/1971 | Harr |
| 3,567,536 A | 3/1971 | Wickersham, Jr. |
| 3,654,057 A | 4/1972 | Olevitch |
| 3,664,904 A | 5/1972 | Cook |
| 3,698,587 A | 10/1972 | Baker et al. |
| 3,772,071 A | 11/1973 | Harr |
| 4,214,053 A | 7/1980 | Porter |
| 4,336,291 A | 6/1982 | Broadhurst et al. |
| 5,680,848 A | 10/1997 | Katoh et al. |
| 6,332,555 B1 | 12/2001 | Stangier |
| 6,913,295 B2 | 7/2005 | Kimisawa et al. |
| 6,994,103 B2 | 2/2006 | Takahashi et al. |
| 7,168,441 B2 | 1/2007 | Miyoshi et al. |
| 7,318,445 B2 | 1/2008 | Ohshiro et al. |
| 7,608,647 B2 | 10/2009 | Tsutsumi et al. |
| 7,845,366 B2 | 12/2010 | Brock et al. |
| 7,955,672 B2 | 6/2011 | Kanazawa et al. |
| 8,043,676 B2 | 10/2011 | Ohnstad et al. |
| 8,191,568 B2 | 6/2012 | Takeuchi et al. |
| 8,753,729 B2 | 6/2014 | Omasa et al. |
| 8,865,315 B2 | 10/2014 | Ozsahin |
| 8,985,380 B2 | 3/2015 | Cook |
| 9,200,719 B2 | 12/2015 | Kishi et al. |
| 9,511,663 B2 | 12/2016 | McAlister |
| 9,808,981 B2 | 11/2017 | Kimura et al. |
| 9,902,260 B2 | 2/2018 | Furusawa |
| 9,931,927 B2 | 4/2018 | Heater et al. |
| 10,005,253 B1 | 6/2018 | Luzetsky et al. |
| 10,011,167 B2 | 7/2018 | Nakamura et al. |
| 10,052,945 B2 | 8/2018 | Kimura et al. |
| 10,549,470 B1 | 2/2020 | Whipple et al. |
| 10,773,589 B2 | 9/2020 | Iino et al. |
| 10,946,737 B2 | 3/2021 | Iino et al. |
| 10,994,464 B1 | 5/2021 | Whipple et al. |
| 2007/0148514 A1 | 6/2007 | Jiang et al. |
| 2007/0197686 A1 | 8/2007 | Dimanshteyn et al. |
| 2007/0290414 A1 | 12/2007 | Criel |
| 2008/0161430 A1 | 7/2008 | Korwin-Edson et al. |
| 2008/0161431 A1 | 7/2008 | Korwin-Edson et al. |
| 2008/0161433 A1 | 7/2008 | Korwin-Edson et al. |
| 2008/0234411 A1 | 9/2008 | Bobsein et al. |
| 2008/0264951 A1 | 10/2008 | Tweet et al. |
| 2010/0187236 A1 | 7/2010 | Le Rossignol et al. |
| 2011/0097954 A1 | 4/2011 | Bone et al. |
| 2011/0146895 A1 | 6/2011 | Borchert et al. |
| 2011/0315690 A1 | 12/2011 | Weisberg |
| 2013/0066010 A1 | 3/2013 | Sagisaka et al. |
| 2013/0273290 A1 | 10/2013 | Luo et al. |
| 2016/0169398 A1 | 6/2016 | Takahashi et al. |
| 2019/0113149 A1 | 4/2019 | Mihara |
| 2019/0136992 A1 | 5/2019 | Bjorkman et al. |
| 2019/0210456 A1 | 7/2019 | Walkowski et al. |
| 2020/0086737 A1 | 3/2020 | Ito et al. |
| 2020/0406745 A1 | 12/2020 | Arras et al. |
| 2021/0221221 A1 | 7/2021 | Huijzen et al. |

FOREIGN PATENT DOCUMENTS

| | | |
|---|---|---|
| CN | 105269797 A | 1/2016 |
| CN | 104010814 B | 8/2016 |
| CN | 104918814 B | 1/2018 |
| CN | 109664750 A | 4/2019 |
| EP | 0816151 B1 | 5/2000 |
| EP | 1640151 A1 | 3/2006 |
| EP | 1591370 B1 | 4/2007 |
| EP | 2193914 B1 | 6/2011 |
| EP | 2687629 A1 | 1/2014 |
| EP | 2048079 B1 | 12/2019 |
| EP | 3092140 B1 | 2/2020 |
| JP | 4135664 B2 | 8/2008 |
| JP | 2009520337 A | 5/2009 |
| JP | 4781038 B2 | 9/2011 |
| JP | 5107955 B2 | 12/2012 |
| KR | 101313379 B1 | 10/2013 |
| KR | 1020130131486 A | 12/2013 |
| KR | 1020170096222 A | 8/2017 |
| KR | 102131465 B1 | 7/2020 |
| WO | 2019166422 A1 | 9/2019 |

SELF-SEALING COATING FOR FUEL TANKS

CROSS-REFERENCE TO RELATED APPLICATION

This application is a continuation of U.S. patent application Ser. No. 17/738,670, filed on May 6, 2022, entitled "Self-Sealing Coating for Fuel Tanks", which claims the benefit of U.S. Provisional Patent Application No. 63/185,437, filed May 7, 2021, the disclosure of which is hereby incorporate by reference in its entirety.

BACKGROUND OF THE INVENTION

Field of the Invention

The present disclosure is generally directed to a fuel tank and methods of forming a fuel tank system and, in particular, to a self-sealing coating for fuel tanks.

Technical Considerations

In certain vehicles, fuel tanks are provided in order to contain the fuel used to power said vehicles. The fuel tank is typically mounted onto the frame of the vehicle and is connected to the engine in order to continuously provide fuel for operation of the vehicle. The fuel tank will contain the fuel for the vehicle until such time that said fuel is needed to power the vehicle, where at such point a portion of the fuel will be ushered to the engine. These fuel tanks may be used in a number of different applications including military vehicles, commercial vehicles, large/heavy vehicles, secondary fuel transportation devices and vehicles, and the like.

Typically, the fuel contained by the fuel tank is a combustible compound, such as gasoline, diesel, and/or another petroleum-based compound. During the lifetime of the fuel tank, said fuel tank may be subject to weathering due to atmospheric exposure (e.g., oxidation), or may even be punctured, such as by munition or an obstruction present in the road or path. Due to the fuel tank being punctured and/or compromised, the fuel contained within may leak out. This leak of fuel is dangerous to the further operation of the vehicle because the fuel leaking from the fuel tank may be ignited; causing a fire and/or explosion that puts any person in proximity in danger.

Currently, sheets of swellable material may be used to prevent leakage of fuel from the fuel tank. The swellable material of these sheets may be a material that swells when exposed to a fuel. Referring to FIG. 1, sheets of swellable material 2 may be cut to the shape of the fuel tank container 1 and secured to the external surfaces 3 of the container 1. However, due to the complex geometry of fuel tanks, it is difficult to cut the sheets of swellable material 2 to cover the external surfaces 3 of the container 1, leading to a lesser protected external surfaces 3 and the possibility of fuel leaking out without being sealed by the swellable material. Further, the measuring and cutting of each sheet of swellable material 2 is excessively time consuming, resulting in a production time for a fuel tank comprising said sheets of swellable material 2 of over a week. Similar difficulties are observed when trying to cover the internal surfaces of the container 1 with the sheets of swellable material.

SUMMARY OF INVENTION

In view of the foregoing, there is a current need for a coating composition that may be applied onto a fuel tank and that swells when exposed to a fuel to seal one or more holes that become immediately present in the fuel tank due to the effect of munitions, which may be referred to herein as a self-sealing fuel tank. Further, there is a current need in the art for a method of forming a self-sealing fuel tank. In addition, there is a current need in the art for a method of sealing one or more holes in a fuel tank comprising a fuel.

In one aspect of the present invention, a method of forming a self-sealing fuel tank includes: providing a container including internal surfaces and external surfaces and configured to hold a fuel; forming a latex coating layer over at least a portion of the internal surfaces and/or external surfaces; depositing or encapsulating an environmental layer over at least a portion of the latex coating layer; where the latex coating layer swells when contacted with the fuel; and where the latex coating layer is formed from a latex coating composition that is substantially free of a non-ionic associative thickener.

In another aspect of the present invention, a self-sealing fuel tank includes: a container including internal surfaces and external surfaces and configured to hold a fuel; a latex coating layer over at least a portion of the internal surfaces and/or external surfaces; and an environmental layer over at least a portion of the latex coating layer; where the latex coating layer swells when contacted with the fuel; and where the latex coating layer is formed from a latex coating composition that is substantially free of a non-ionic associative thickener.

In another aspect of the present invention, a method of sealing one or more punctures in the wall of a container includes: forming a latex coating layer over at least a portion of the internal surfaces and/or external surfaces; where the container comprises a fuel which contacts the latex coating layer at one or more surfaces exposed by the one or more punctures; where said contact between the fuel and the latex coating layer causes the latex coating layer to swell and seal the one or more punctures; and where the latex coating layer is formed from a latex coating composition that is substantially free of a non-ionic associative thickener.

The present invention is also disclosed according to the following clauses:

Clause 1: A method of forming a self-sealing fuel tank, comprising: providing a container comprising internal surfaces and external surfaces and configured to hold a fuel; forming a latex coating layer over at least a portion of the internal surfaces and/or external surfaces; and depositing or encapsulating an environmental layer over at least a portion of the latex coating layer; wherein the latex coating layer swells when contacted with the fuel; and wherein the latex coating layer is formed from a latex coating composition that is substantially free of a non-ionic associative thickener.

Clause 2: The method of clause 1, wherein the forming step further comprises applying the latex coating composition onto at least a portion of the internal surfaces and/or the external surfaces, and curing the latex coating composition to form the latex coating layer.

Clause 3: The method of clause 1, wherein the forming step further comprises molding and curing the latex coating composition into preformed layers, and affixing the preformed layers over at least a portion of the internal surfaces and/or external surfaces.

Clause 4: The method of any of clauses 1-3, further comprising depositing an adhesion promoter over at least a portion of the internal surfaces and/or external surfaces prior to forming the latex coating layer.

Clause 5: The method of clause 2, wherein the applying step comprises spraying, casting, brushing, rolling, and/or dipping the latex coating composition onto at least a portion of the external surfaces of the container.

Clause 6: The method of clause 2, wherein the applying step comprises spraying, casting, brushing, rolling, and/or dipping the latex coating composition onto at least a portion of the internal surfaces of the container.

Clause 7: The method of any of clauses 1-6, wherein the depositing or encapsulating step further comprises spraying and/or casting an environmental coating composition over at least a portion of the latex coating layer and curing the environmental coating composition to form the environmental layer, or molding and curing the environmental coating composition into preformed layers and affixing the preformed layers over at least a portion of the latex coating layer.

Clause 8: The method of any of clauses 1-7, further comprising compounding at least one latex polymer, an ionic gelling agent, and a foaming agent to form the latex coating composition.

Clause 9: The method of any of clauses 1-8, wherein the curing step comprises heating the latex coating composition to a temperature in the range of 60° C. to 95° C.

Clause 10: The method of any of clauses 1-9, wherein the latex coating composition is a one-component coating composition.

Clause 11: The method of any of clauses 1-10, wherein the latex coating layer has a density in a range of from 0.09 g/cc to 0.50 g/cc.

Clause 12: The method of any of clauses 1-11, wherein the latex coating layer has a tensile strength in a range of from 20 psi to 200 psi.

Clause 13: The method of any of clauses 1-12, wherein the environmental layer is in direct contact with the latex coating layer.

Clause 14: The method of any of clauses 1-12, further comprising providing a barrier and/or strengthening layer over at least a portion of the latex coating layer, and depositing or encapsulating the environmental layer over at least a portion of the barrier and/or strengthening layer.

Clause 15: A self-sealing fuel tank, comprising: a container comprising internal surfaces and external surfaces and configured to hold a fuel; a latex coating layer over at least a portion of the internal surfaces and/or external surfaces; and an environmental layer over at least a portion of the latex coating layer; wherein the latex coating layer swells when contacted with the fuel; and wherein the latex coating layer is formed from a latex coating composition that is substantially free of a non-ionic associative thickener.

Clause 16: The self-sealing fuel tank of clause 15, further comprising an adhesion promoter over at least a portion of the internal surfaces and/or external surfaces and in between the portion of the internal surfaces and/or external surfaces and the latex coating layer.

Clause 17: The self-sealing fuel tank of clause 15 or clause 16, wherein the latex coating layer is over at least a portion of the internal surfaces.

Clause 18: The self-sealing fuel tank of any of clauses 15-17, wherein the latex coating layer is over at least a portion of the external surfaces.

Clause 19: The self-sealing fuel tank of any of clauses 15-18, wherein the container comprises a metal, a plastic, and/or a rubber.

Clause 20: The self-sealing fuel tank of any of clauses 15-19, wherein the latex coating composition comprises at least one latex polymer.

Clause 21: The self-sealing fuel tank of clause 20, wherein the latex coating composition further comprises an ionic gelling agent.

Clause 22: The self-sealing fuel tank of clause 20 or clause 21, wherein the latex coating composition further comprises a foaming agent.

Clause 23: The self-sealing fuel tank of any of clauses 20-22, wherein the latex coating composition further comprises a colorant.

Clause 24: The self-sealing fuel tank of any of clauses 20-23, wherein the latex coating composition further comprises a thickening agent.

Clause 25: The self-sealing fuel tank of any of clauses 15-24, wherein the latex coating composition is sprayed, casted, brushed, rolled, and/or dipped onto at least a portion of the internal surfaces and/or the external surfaces.

Clause 26: The self-sealing fuel tank of any of clauses 15-24, wherein the latex coating composition is molded and cured into preformed layers, and the preformed layers are affixed to at least a portion of the internal surfaces and/or external surfaces.

Clause 27: The self-sealing fuel tank of any of clauses 15-26, wherein the latex coating composition is a one-component coating composition.

Clause 28: The self-sealing fuel tank of any of clauses 15-27, wherein the latex coating layer has a density in a range of from 0.09 g/cc to 0.50 g/cc Clause 29: The self-sealing fuel tank of any of clauses 15-28, wherein the latex coating layer has a tensile strength in a range of from 20 psi to 200 psi.

Clause 30: The self-sealing fuel tank of any of clauses 15-29, wherein the environmental layer is in direct contact with the latex coating layer.

Clause 31: The self-sealing fuel tank of any of clauses 15-29, further comprising a barrier and/or strengthening layer over at least a portion of the latex coating layer, and the environmental layer over at least a portion of the barrier and/or strengthening layer.

Clause 32: A method of sealing one or more punctures in the wall of a container, comprising: forming a latex coating layer over at least a portion of the internal surfaces and/or external surfaces; wherein the container comprises a fuel which contacts the latex coating layer at one or more surfaces exposed by the one or more punctures; wherein said contact between the fuel and the latex coating layer causes the latex coating layer to swell and seal the one or more punctures; and wherein the latex coating layer is formed from a latex coating composition that is substantially free of a non-ionic associative thickener.

Clause 33: The method of clause 32, wherein the forming step further comprises applying the latex coating composition onto at least a portion of the internal surfaces and/or external surfaces, and curing the latex coating composition to form the latex coating layer.

Clause 34: The method of clause 32, wherein the forming step further comprises molding and curing the latex coating composition into preformed layers, and affixing the preformed layers over at least a portion of the internal surfaces and/or external surfaces.

Clause 35: The method of any of clauses 32-34, wherein the latex coating layer comprises septum properties such that at least one of the one or more punctures is mechanically sealed prior to swelling with fuel.

Clause 36: The method of any of clauses 32-35, further comprising depositing or encapsulating an environmental layer over at least a portion of the latex coating layer, wherein the environmental layer is in direct contact with the latex coating layer.

Clause 37: The method of any of clauses 32-35, further comprising providing a barrier and/or strengthening layer over at least a portion of the latex coating layer, and depositing or encapsulating an environmental layer over at least a portion of the barrier and/or strengthening layer.

DETAILED DESCRIPTION

Figure 1:
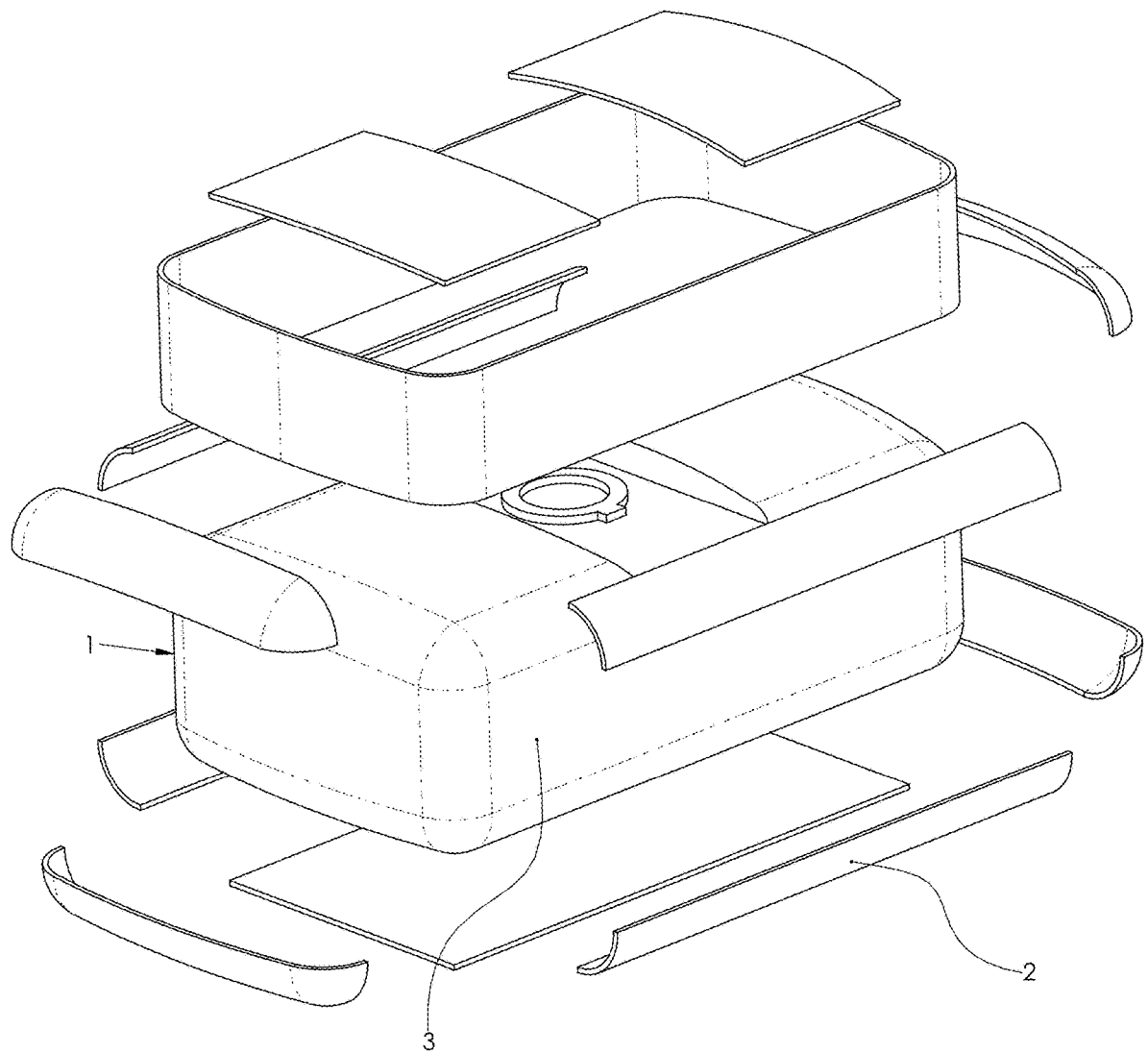
FIG. 1 is the application of rigid cut sheets of coating material to the surface of a fuel tank as is known in the art.

It is to be understood that at least some of the figures and descriptions of the invention have been simplified to illustrate elements that are relevant for a clear understanding of the invention, while eliminating, for purposes of clarity, other elements that those of ordinary skill in the art will appreciate may also comprise a portion of the invention. However, because such elements are well known in the art, and because they do not facilitate a better understanding of the invention, a description of such elements is not provided herein.

In the following detailed description, reference is made to the accompanying drawings, which form a part hereof. In the drawings, similar symbols and reference characters typically identify similar components throughout several views, unless context dictates otherwise. The illustrative embodiments described in the detailed description, drawings and claims are not meant to be limiting. Other embodiments may be utilized, and other changes may be made, without departing from the scope of the technology described herein.

The following description of certain examples of the technology should not be used to limit its scope. Other examples, features, aspects, embodiments and advantages of the technology will become apparent to those skilled in the art from the following description, which is by way of illustration, one of the best modes contemplated for carrying out the technology. As will be realized, the technology described herein is capable of other different and obvious aspects, all without departing from the technology. Accordingly, the drawings and descriptions should be regarded as illustrative in nature and not restrictive.

It is further understood that any one or more of the teachings, expressions, embodiments, examples, etc. described herein may be combined with any one or more of the other teachings, expressions, embodiments, examples, etc. that are described herein. The following described teachings, expressions, embodiments, examples, etc. should therefore not be viewed in isolation relative to each other. Various suitable ways in which the teachings herein may be combined will be readily apparent to those of ordinary skill in the art in view of the teachings herein. Such modifications and variations are intended to be included within the scope of the claims.

Before explaining the various embodiments of the fuel tank in detail, it should be noted that the various embodiments disclosed herein are not limited in their application or use to the details of construction and arrangement of parts illustrated in the accompanying drawings and description. Rather, the disclosed embodiments may be positioned or incorporated in other embodiments, variations and modifications thereof, and may be practiced or carried out in various ways. Accordingly, embodiments of the fuel tanks disclosed herein are illustrative in nature and are not meant to limit the scope or application thereof. Furthermore, unless otherwise indicated, the terms and expressions employed herein have been chosen for the purpose of describing the embodiments for the convenience of the reader and are not meant to limit the scope thereof. In addition, it should be understood that any one or more of the disclosed embodiments, expressions of embodiments, and/or examples thereof, can be combined with any one or more of the other disclosed embodiments, expressions of embodiments, and/or examples thereof, without limitation.

Also, in the following description, it is to be understood that terms such as outward, inward, above and the like are words of convenience and are not to be construed as limiting terms. Terminology used herein is not meant to be limiting insofar as devices described herein, or portions thereof, may be attached or utilized in other orientations. The various embodiments will be described in more detail with reference to the drawings.

The discussion of the invention may describe certain features as being "particularly" or "preferably" within certain limitations (e.g., "preferably", "more preferably", or "most preferably", within certain limitations). It is to be understood that the invention is not limited to these particular or preferred limitations but encompasses the entire scope of the disclosure.

Additionally, as used herein, a second layer and/or second composition deposited and/or provided "over" a first layer and/or first composition means that the second layer and/or second composition is further away from the substrate (e.g., internal and/or external surfaces) than the first layer and/or first composition, but does not necessarily mean that the second layer and/or second composition is in direct contact with the first layer and/or first composition and does not prohibit additional layers and/or compositions from being positioned therebetween, nor does the term "over" prohibit the second layer and/or second composition from being in direct contact with the first layer and/or first composition.

While several aspects of the fuel tank are shown in the accompanying figures and described in detail hereinabove, other aspects will be apparent to, and readily made by, those skilled in the art without departing from the scope and spirit of the disclosure. Accordingly, the foregoing description is intended to be illustrative rather than restrictive. The invention described hereinabove is defined by the appended claims and all changes to the invention that fall within the meaning and range of equivalency of the claims are to be embraced within their scope.

Figure 2:
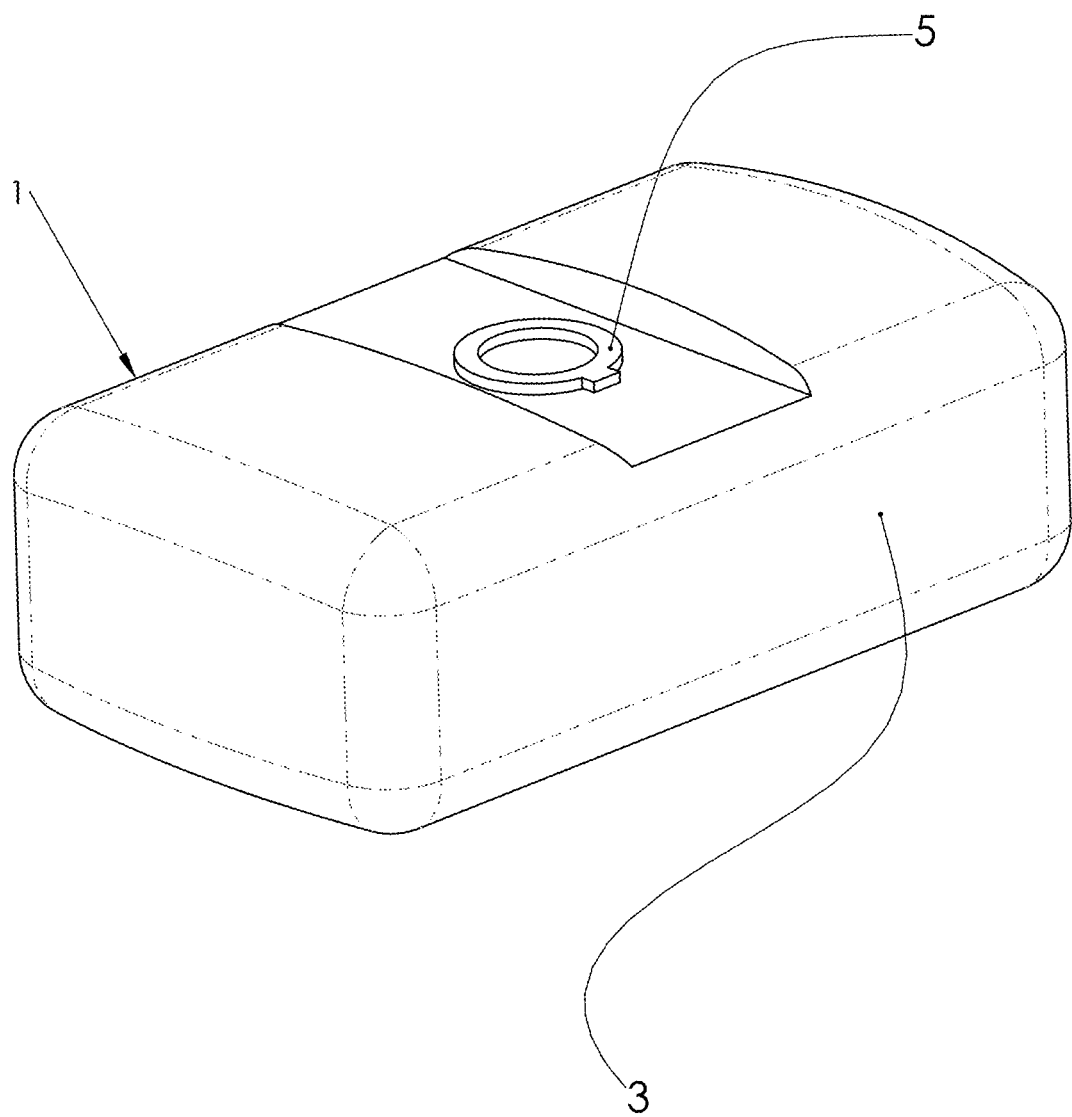
FIG. 2 is an isometric view of a formed container of a fuel tank according to one aspect of the present invention.

In one non-limiting example of the present invention, a method of forming a self-sealing fuel tank is provided. Referring to FIG. 2, the method of forming a self-sealing fuel tank includes providing a container 1. The container 1 comprises external surfaces 3 and internal surfaces 4 (see FIG. 4). The container 1 may comprise any material known in the art.

For example, the container 1 may comprise metallic materials and/or non-metallic materials. The container 1 may comprise a metallic material including, but not limited to, steel, cold-rolled steel, galvanized steel, stainless steel, tin, aluminum, zinc, iron, and a combination thereof. The container 1 may comprise a non-metallic material including, but not limited to, polymers and plastics such as a polyolefin, polyethylene such as high molecular weight polyethylene (HDPE), low molecular weight polyethylene (LDPE), cross-linked polyethylene (XLPE), and/or ultra-high molecular weight polyethylene (UHMWPE), polyester, polyamide, polyimide, poly(meth)acrylate, polypropylene, nylons, polyether ether ketone, and combinations thereof, and composites such as fiberglass, carbon fiber and epoxy blends, epoxy infusions with various fillers, polyimides and carbon fiber composites, and combinations thereof. The container 1 may comprise rubber, including, but not limited to, natural rubber, synthetic rubber such as chloroprene rubber, styrene-butadiene rubber, nitrile rubber, and/or the like, or a combination thereof.

The container 1 may also include an opening 5. The opening 5 may allow for a fuel to be added to the container 1 and contained within the internal surfaces 4. The opening 5 may be connected to one or more pipes and/or tubes and one or more valves that allow for the opening to be open or closed, such that, when the container 1 is not being filled, the opening 5 may be closed from external contaminates.

The container 1 comprises an internal volume that is configured to contain a fuel. The fuel may include gasoline, diesel fuel, motor oil, other petroleum-based compounds, and the like.

The method further includes forming a latex coating layer 9 over at least a portion of the internal surfaces 4 and/or external surfaces 3 of the container 1.

In some non-limiting embodiments, the latex coating layer 9 may be formed by molding and curing a latex coating composition 6 (described below) into preformed layers. The preformed layers of latex coating composition 6 may be formed such that the preformed layers correspond to the shape of the internal surfaces 4 and/or external surfaces 3 of the container 1. The preformed layers may then be affixed to at least a portion of the internal surfaces 4 and/or external surfaces 3 of the container 1.

Figure 3:
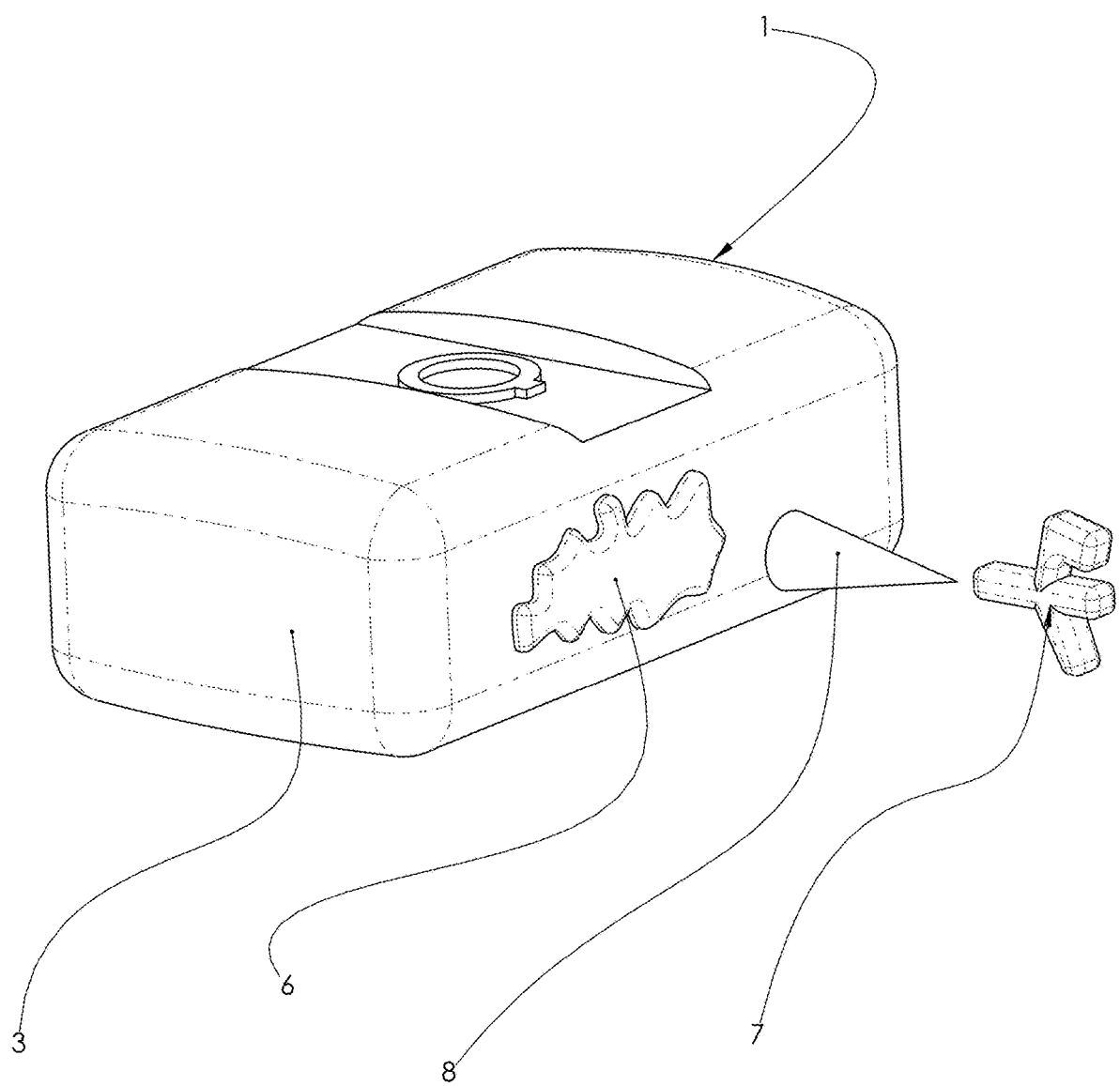
FIG. 3 is a diagram depicting the application of a coating composition according to another aspect of the present invention.

Referring to FIG. 3, in some non-limiting embodiments, the latex coating layer 9 may be formed by applying a latex coating composition 6 onto at least a portion of the internal surfaces 4 and/or external surfaces 3 of the container 1. For example, the applying step may include spraying, casting, brushing, rolling, dipping, and/or similar methods of applying a coating composition. The spraying, casting, dipping, brushing, rolling, and/or the like of the latex coating composition 6 has the benefit of significantly reducing the amount of time to produce a self-sealing fuel tank by up to 30% based on the amount of time to produce a self-sealing fuel tank using known methods in the art (i.e., FIG. 1). For example, the applying step may include spraying the latex coating composition 6 onto at least a portion of the internal surfaces 4 and/or external surfaces 3 of the container 1. The latex coating composition 6 may be selected such that it may be sprayed from a reservoir by a spraying gun 7. The spray gun 7 may shoot a stream 8 of the latex coating composition 6 in the direction of the container 1, such that the latex coating composition 6 may be deposited onto at least a portion of the external surfaces 3 and/or the internal surfaces 4 of the container 1. Additionally, the sprayability of the latex coating composition 6 also allows for the swellable latex coating layer 9 to be formed over complex geometries. In the prior art, it is difficult to cut and shape enough sheets of swellable material to cover the entire surface of the fuel tank leading to increased production times and poor coating coverage.

Figure 4:
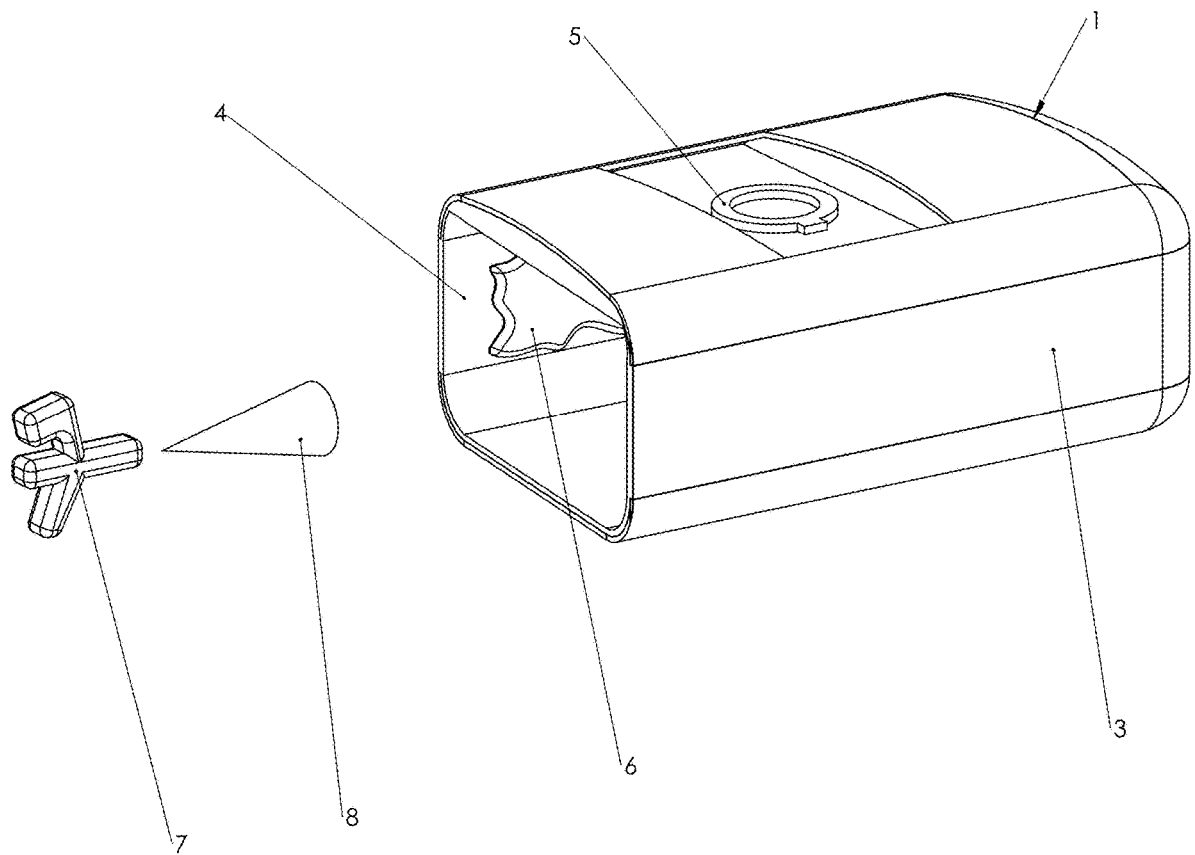
FIG. 4 is a diagram depicting the application of a coating composition according to another aspect of the present invention.

The spraying gun 7 may apply the latex coating composition 6 to the external surfaces 3 of the container 1. If the latex coating composition 6 is to be applied to the external surfaces 3, the container 1 may be fully formed into the desired geometry prior to spraying the latex coating composition 6 onto the external surfaces 3. Alternatively, the latex coating composition 6 may be applied to the external surfaces of the container 1 prior to forming the final geometry of the container 1, such as applying the latex coating composition 6 to individual container surface sheets that will be fastened together to form the container 1 or applying the latex coating composition 6 to the external surfaces 3 of the unfolded container 1, where each unfolded side will be folded along a specified line and fastened to adjacent surfaces to form the container 1. Alternatively or in addition to applying the latex coating composition 6 to the external surfaces 3 of the container 1, the spray gun 7 may apply the latex coating composition 6 to the internal surfaces 4 of the container 1, as is shown in FIG. 4. If the latex coating composition 6 is to be applied to the internal surfaces 4, the latex coating composition 6 may be applied to the internal surfaces 4 of the container 1 prior to forming the final geometry of the container 1. As such, the container 1 may be partially formed, such that the spray gun 7 may apply the latex coating composition 6 to the internal surfaces 4 of the container 1.

The latex coating composition 6 includes at least one latex polymer. As used herein, a "latex polymer" refers to polymeric particles that have been dispersed in an aqueous medium to form an emulsion. The at least one latex polymer may be any rubber or elastomer known in the art. For example, the latex coating composition 6 may include at least one latex polymer that forms a coating that swells when contacted with a fuel. The at least one latex polymer may be a swellable latex polymer that swells or initiates the swelling of the latex coating composition it is contained within. The at least one latex polymer may comprise a natural latex polymer, a synthetic latex polymer, or a combination thereof. As used herein, a "natural" latex polymer refers to a latex polymer that is derived from natural resources and needs no additional chemical synthesis. As used herein, a "synthetic" latex polymer refers to a latex polymer that is produced from chemical synthesis. If the latex coating composition 6 comprises a synthetic latex polymer, the synthetic latex polymer may provide the latex coating composition 6 with reduced fungal growth and reduced allergic reaction potential. Non-limiting examples of a synthetic latex polymer include chloroprene rubber, styrene-butadiene rubber, nitrile rubber, and/or the like.

The latex coating composition 6 may include at least one latex polymer, or at least two latex polymers, or at least three latex polymers, or at least four latex polymers. For example, the latex coating composition 6 may include at least two latex polymers comprising at least a first latex polymer and second latex polymer. In some non-limiting embodiments, the latex coating composition 6 may comprise at least two latex polymers, where the first latex polymer is a swellable latex polymer and the second latex polymer is not a swellable latex polymer. In some non-limiting embodiments, the latex coating composition 6 comprises at least two latex polymers, wherein both the first and second latex polymers are swellable latex polymers. In some non-limiting embodiments, if more than one latex polymer is present in the latex coating composition 6, one of said latex polymers may be a swellable latex polymer while the remaining latex polymers are optionally swellable latex polymers.

The latex coating composition 6 may comprise the at least one latex polymer in at least 40 weight %, or at least 45 weight %, or at least 50 weight %, based on the total solids weight of the latex coating composition. The latex coating composition 6 may comprise the at least one latex polymer in up to 70 weight %, based on the total solids weight of the latex coating composition. The latex coating composition 6 may comprise the at least one latex polymer in the range of from 40 weight % to 70 weight %, or in the range of from 45 weight % to 70 weight %, or in the range of from 50 weight % to 70 weight %, based on the total solids weight of the latex coating composition.

The latex coating composition 6 may include a curing agent. As used herein, a "curing agent" refers to a compound that reacts with the functionality of one or more compounds present to form crosslinks between said one or more compounds in order to cure the latex coating composition. The curing agent may be any curing agent known in the art to cure latex-based coating compositions. For example, the curing agent may comprise a transition metal. Non-limiting examples of curing agents include zinc-containing curing agents such as zinc-2-mercaptobenzothia-zole, zinc dithio-carbamates, and combinations thereof.

The at least one latex polymer may be provided in combination with the curing agent in the form of a latex base mixture. The latex base mixture may further include additional components, such as additives including colorants, antioxidants, and/or the like. The latex coating composition 6 may comprise the latex base mixture (e.g., at least one latex polymer, curing agent, and optional additives) in the range of from 40 weight % to 70 weight %, based on the total solids weight of the latex coating composition.

The latex coating composition 6 may include a foaming agent. As used herein, a "foaming agent" refers to any compound that facilitates the formation of foam. The foaming agent may increase the surface area of the portion of the latex coating layer 9 that swells while also increasing the swelling rate and decreasing the density of the latex coating layer 9. The latex coating composition 6 may include any foaming agent known in the art. For example, the foaming agent may include surfactants, blowing agents, or combinations thereof.

The latex coating composition 6 may include any surfactant known in the art. Non-limiting examples of surfactants include sulfates, sulfonates, phosphates, carboxylates, ethoxylates, fatty acid esters, potassium hydroxide, and/or the like.

The latex coating composition 6 may include any blowing agent known in the art. Non-limiting examples of blowing agents include chlorofluorocarbons, hydrochlorofluorocarbons, hydrocarbons, liquid carbon dioxide, isocyanates, azodicarbonamide, hydrazine and like nitrogen-based compounds, sodium bicarbonate, and/or the like.

The foaming agent may be provided in solution, such as a foaming agent in solvent and/or water.

The latex coating composition 6 may comprise the foaming agent in at least greater than 0 weight %, or at least 1 weight %, based on the total weight of the latex coating composition. The latex coating composition 6 may comprise the foaming agent in up to 30 weight %, or up to 20 weight %, or up to 16 weight %, based on the total weight of the latex coating composition. The latex coating composition 6 may comprise the foaming agent in the range of from greater than 0 weight % to 30 weight %, or in the range of from greater than 0 weight % to 20 weight %, or in the range of from greater than 0 weight % to 16 weight %, or in the range of from 1 weight % to 20 weight %, or in the range of from 1 weight % to 16 weight %, based on the total weight of the latex coating composition.

The latex coating composition 6 may include a gelling agent, such as an ionic gelling agent. As used herein, a "gelling agent" refers to a compound that can form a gel and increases the viscosity of the latex coating composition without changing the other properties of the coating composition. The latex coating composition 6 may include any gelling agent known in the art that may gel the present coating compositions. For example, the gelling agent may comprise sodium silicofluoride, and/or the like.

The gelling agent may be provided in solution, such as a gelling agent in solvent and/or water.

The latex coating composition 6 may comprise the gelling agent in at least greater than 0 weight %, or at least 0.3 weight %, based on the total weight of the latex coating composition. The latex coating composition 6 may comprise the gelling agent in up to 10 weight %, or up to 4 weight %, based on the total weight of the latex coating composition. The latex coating composition 6 may comprise the gelling agent in the range of from greater than 0 weight % to 10 weight %, or in the range of from 0.3 weight % to 4 weight %, based on the total weight of the latex coating composition.

The latex coating composition 6 may comprise a thickening agent. A thickening agent, also known as a rheological modifier, may be used to modify the viscosity of the latex coating composition 6. For example, the latex coating composition 6 may comprise a non-ionic associative thickener. As used herein, "associative" thickeners refer to thickeners which comprise a mechanism by which they thicken which is believed to involve hydrophobic associations between the hydrophobic moieties in the thickener molecules and/or between the hydrophobic moieties in the thickener molecules and other hydrophobic surfaces. A "non-ionic" associative thickener refers to a thickener molecule with no charge and that does not dissociate into ions when in solution. The non-ionic nature of the non-ionic associative thickener maintains the foam and colloidal stability while increasing its viscosity, which is contrary to ionic rheological modifiers. Non-ionic associative thickeners include, but are not limited to, HEAT type (mealamine/aminoplast linkages), HEUR type (urethane linkages), associative thickeners with polymeric backbones constructed from one or more blocks of polymerized oxyalkylene units (e.g., polyethylene oxide, polypropylene oxide, and/or the like) with hydrophobic groups attached to or within the backbone, associative thickeners with a cellulosic backbone with hydrophobic groups attached to the backbone, non-ionic polyether thickeners, polyether associative thickeners, and/or the like.

Alternatively, the latex coating composition 6 may be substantially free, essentially free, or completely free of a thickening agent. The phrase "substantially free of a thickening agent" means that the latex coating composition 6 contains less than 1000 parts per million by weight (ppm) of a thickening agent based on the total solids weight of the latex coating composition 6, "essentially free of a thickening agent" means that the latex coating composition 6 contains less than 100 ppm of a thickening agent based on the total solids weight of the latex coating composition 6, and "completely free of a thickening agent" means that the latex coating composition 6 contains less than 20 parts per billion by weight (ppb) of a thickening agent based on the total solids weight of the latex coating composition 6. For example, the latex coating composition 6 may comprise no thickening agent.

Alternatively, the latex coating composition 6 may be substantially free, essentially free, or completely free of a non-ionic associative thickener. The phrase "substantially free of a non-ionic associative thickener" means that the coating latex composition 6 contains less than 1000 ppm of a non-ionic associative thickener based on the total solids weight of the latex coating composition 6, "essentially free of a non-ionic associative thickener" means that the latex coating composition 6 contains less than 100 ppm of a non-ionic associative thickener based on the total solids weight of the latex coating composition 6, and "completely free of a non-ionic associative thickener" means that latex coating composition 6 contains less than 20 ppb of a non-ionic associative thickener based on the total solids weight of the latex coating composition 6. For example, the latex coating composition 6 may comprise no non-ionic associative thickener.

The latex coating composition 6 may include a colorant. As used herein, a "colorant" refers to a compound that imparts color or opacity change and/or effect to the latex coating composition. The colorant may be in the form of solid particles and/or flakes, or provided in a dispersion or solution. Examples of colorants include pigments, dyes, tints, and the like. For example, in one non-limiting embodiment, the latex coating composition 6 may comprise a tint, such as a MIXOL brand, binder-free tint under the name multi-purpose tinting paste, universal tinting baste, universal tint, and the like.

Example pigments include carbazole dioxazine crude pigment, azo, monoazo, diazo, naphthol AS, benzimidazolone, isoindolinone, isoindoline and polycyclic phthalocyanine, quinacridone, perylene, perinone, diketopyrrolo pyrrole, thioindigo, anthraquinone, indanthrone, anthrapyrimidine, flavanthrone, pyranthrone, anthanthrone, dioxazine, triarylcarbonium, quinophthalone pigments, diketo pyrrolo pyrrole red ("DPPBO red"), titanium dioxide, carbon black, and mixtures thereof.

Example dyes include phthalo green or blue, iron oxide, bismuth vanadate, anthraquinone, and peryleneand quinacridone.

For example, the latex coating composition 6 may include a colorant comprising a pigment, such as a black pigment. The black pigment may be used in the latex coating composition 6, such that the latex coating layer 9 comprises a black or a dark grey aesthetic.

The latex coating composition 6 may comprise the colorant typically in the range of from 0.5 weight % to 1 weight %, based on the total solids weight of the latex coating composition.

The latex coating composition 6 may be a one-component (1K) coating composition. As used herein, a "one-component (1K)" coating composition refers to a composition where all of the components are maintained in the same container during storage, and may remain stable for longer than 24 hours at ambient conditions. For example, the latex coating composition 6 may be a one-component (1K) coating composition that is stable at ambient conditions for longer than 10 minutes, or for longer than 20 minutes, or for longer than 30 minutes, or for longer than 1 hour, or for longer than 2 hours, or for longer than 5 hours, or for longer than 10 hours, or for longer than 24 hours, or for longer than 48 hours, or for longer than 1 week, or for longer than 1 month, or for longer than 1 year.

Alternatively, the latex coating composition 6 may be a two-component (2K) coating composition. As used herein, a "two-component (2K)" coating composition refers to a composition where at least two components are maintained in separate containers during storage prior to application to a substrate.

The materials used to form the latex coating composition 6 as described herein not only produce coatings with swellable and septum properties, but also reduce the cost of forming the latex coating composition 6. For example, the specific materials chosen for the latex coating composition 6, in combination with the ability to apply the latex coating composition 6 using a method other than cutting individual sheets of material, results in a reduction in the cost of form the swellable latex coating layer and the self-sealing fuel tank compared to a swellable latex coating layer formed by known materials and forming individual sheets of material to form the self-sealing fuel tank.

The latex coating composition 6 may be formed by first measuring out appropriate amounts, such as the amounts described herein, of at least one latex polymer, curing agent, pigment, optional antioxidants, and/or foaming agent, and adding each of said components to a mixer and mixing for a period of time, such as mixing for 2 minutes to 7 minutes. After mixing the aforementioned components, a gelling agent may be measured in the appropriate amount, such as the amounts described herein, and added to the mixer. The mixture with gelling agent may then be mixed until a desired volume is achieved, thereby forming the latex coating composition 6. For example, this process of forming the latex coating composition 6 may form a one-component latex coating composition.

After formation of the latex coating composition 6, the latex coating composition 6 may be loaded into a spray gun 7, such as a single-part sprayer. The phrase "single-part" sprayer means that the sprayer only loads one component or composition, instead of two components/compositions that are mixed together during spraying. The latex coating composition 6 is then sprayed by the spray gun 7 onto the external surfaces 3 and/or internal surfaces 4 of the container 1. The spray gun 7 may spray the latex coating composition 6 with a pressure of about 1 atm (i.e., 13-15 psi).

The forming of the latex coating layer 9 may further include curing the latex coating composition 6. The latex coating composition 6 may be cured after the latex coating composition 6 has been applied to the external surfaces 3 and/or the internal surfaces 4 of the container 1. Alternatively, the latex coating composition 6 may be cured in a mold to form preformed layers. The latex coating composition 6 may be cured at ambient conditions. As used herein, "ambient conditions" refers to a temperature in the range of from 20° C.-25° C. and a pressure of about 1 atm. For example, the latex coating composition 6 may be cured at ambient conditions for greater than 8 hours, or greater than 12 hours, or greater than 24 hours, or greater than 48 hours.

Alternatively, the latex coating composition 6 may be cured at elevated conditions. For example, the latex coating composition 6 may typically be cured at a temperature of greater than 50° C., or greater than 60° C., or greater than 70° C. The latex coating composition 6 may typically be cured at a temperature of up to 95° C., or up to 90° C., or up to 80° C. The latex coating composition 6 may be cured at a temperature in the range of 50° C. to 95° C., or in the range of 60° C. to 95° C., or in the range of 60° C. to 90° C., or in the range of 70° C. to 80° C. The latex coating composition 6 may be cured at elevated conditions for greater than 2 hours, or greater than 3 hours, or greater than 4 hours. The latex coating composition 6 may be cured at elevated conditions for up to 24 hours, or up to 20 hours, or up to 18 hours. The latex coating composition 6 may be cured at elevated conditions for 2 hours to 24 hours, or for 2 hours to 20 hours, or for 2 hours to 18 hours, or for 3 hours to 24 hours, or for 3 hours to 20 hours, or for 3 hours to 18 hours, or for 4 hours to 24 hours, or for 4 hours to 20 hours, or for 4 hours to 18 hours.

Once the final latex coating composition 6 is cured, a latex coating layer 9 is formed. The latex coating layer 9 is a swellable latex coating layer 9. As used herein, a "swellable" latex coating layer refers to a coating layer that expands beyond its final cured dimensions when contacted with a fuel. For example, the fuel that contacts the swellable latex coating layer 9 may be a fuel comprising gasoline and/or diesel fuel. The swellable latex coating layer 9 may be in direct contact with the external surfaces 3 and/or the internal surfaces 4 of the container 1.

For example, in the field of vehicles and machinery, fuel tanks may be punctured, allowing for fuel contained within the fuel tank to leak out. By coating the fuel tank with a swellable latex coating layer 9, the swellable latex coating layer 9 will swell when contacted with the fuel via the leakage through the punctured hole in the container 1. The contacting of the fuel with the latex coating layer 9 initiates the swelling of the latex coating layer 9. For example, the contacting of the fuel with the latex coating layer 9 may reduce the modulus of the latex coating layer 9, thus allowing the latex coating layer 9 to expand inward to seal the one or more punctures. Once the one or more punctures are sealed, the fuel can no longer contact the latex coating layer 9 and therefore no long swells and/or expands.

In addition to the swelling properties, the swellable latex coating layer 9 also comprises septum properties. For example, if the fuel tank is punctured, including puncturing the swellable latex coating layer 9, the elastomeric properties of the swellable latex coating layer 9 will cause the swellable latex coating layer 9 surrounding the puncture to instantaneously and elastically return to its original form, thereby partially, or even completely, sealing the puncture hole prior to the latex coating layer 9 swelling due to contact with the fuel, such that no additional fuel may exit via said recently sealed hole. The swellable latex coating layer 9 may have an elongation strain that is sufficient to maintain the structural integrity of the swellable latex coating layer 9 when the tank rapidly expands from ballistic pressure. As such, the swellable latex coating layer 9 discussed herein has the benefit of reducing the cost and the time needed to form a fuel tank with no loss in the ballistic functionality. The swellable latex coating layer 9 may have a density that allows for additional materials, such as the environmental layer 10, to be added over at least a portion of the swellable latex coating layer 9 without sacrificing the structural integrity of the swellable latex coating layer 9. As used herein, maintaining the "structural integrity" of the swellable latex coating layer 9 refers to the ability of the swellable latex coating layer 9 to remain a continuous coating deposited onto the external surfaces 3 and/or internal surfaces 4 of the container 1 when placed under one or more stresses. The swellable latex coating layer 9 may be of sufficient thickness to allow for the septum properties and swelling properties may effectively seal the one or more holes.

The swellable latex coating layer 9 may have a density of at least 0.09 grams per cubic centimeter (g/cc). The swellable latex coating layer 9 may have a density of up to 0.50 g/cc. The swellable latex coating layer 9 may have a density in the range of from 0.09 g/cc to 0.50 g/cc. The swellable latex coating layer 9 may achieve a density in the range of from 0.09 g/cc to 0.50 g/cc without the inclusion of a thickening agent, such as a non-ionic associative thickener. Unless stated otherwise, density was calculated herein by measuring the mass and the dimensions of a die-cut cured specimen of material, where the dimensions were measured using SPI digital calipers, model 15-719-8, and mass was measured using a Sartorius digital balance, model ENTRIS3202-1S.

The swellable latex coating layer 9 may have a tensile strength of at least 20 psi. The swellable latex coating layer 9 may have a tensile strength of up to 200 psi. The swellable latex coating layer 9 may have a tensile strength in the range of from 20 psi to 200 psi. The swellable latex coating layer 9 may achieve a tensile strength in the range of from 20 psi to 200 psi without the inclusion of a thickening agent, such as a non-ionic associative thickener. Unless stated otherwise, tensile strength was measured herein in accordance with ASTM D412-A using a Shimadzu Load Frame, model AGS-X, and a 1 kN load cell.

The method may optionally include applying additional coating compositions over at least a portion of the latex coating layer 9, and curing the additional coating compositions to form additional coating layers over at least a portion of the latex coating layer 9. The additional coating compositions may comprise any of the components of the latex coating composition 6. The additional coating compositions may be cured to form swellable coating layers. For example, additional coating compositions may be applied over at least a portion of the swellable latex coating layer 9 to form at least one additional coating layer, or at least two additional coating layers, or at least three additional coating layers, or at least four additional coating layers.

The method may optionally include providing a barrier and/or strengthening layer (not shown) over at least a portion of the swellable latex coating layer 9. The barrier and/or strengthening layer may provide additional support to the swellable latex coating layer 9 in maintaining its application onto the container 1 and its structural integrity. Non-limiting examples of materials that may be used for the barrier and/or strengthening layer include Kevlar (commercially available from DuPont de Nemours, Inc.) and Dyneema (commercially available from Koninklijke DSM N.V.). Alternatively, the latex coating composition 6 that forms the swellable latex coating layer 9 may be sufficient in achieving the desired application and structural integrity, such that no barrier and/or strengthening layers are present over the swellable latex coating layer 9.

Figure 5:
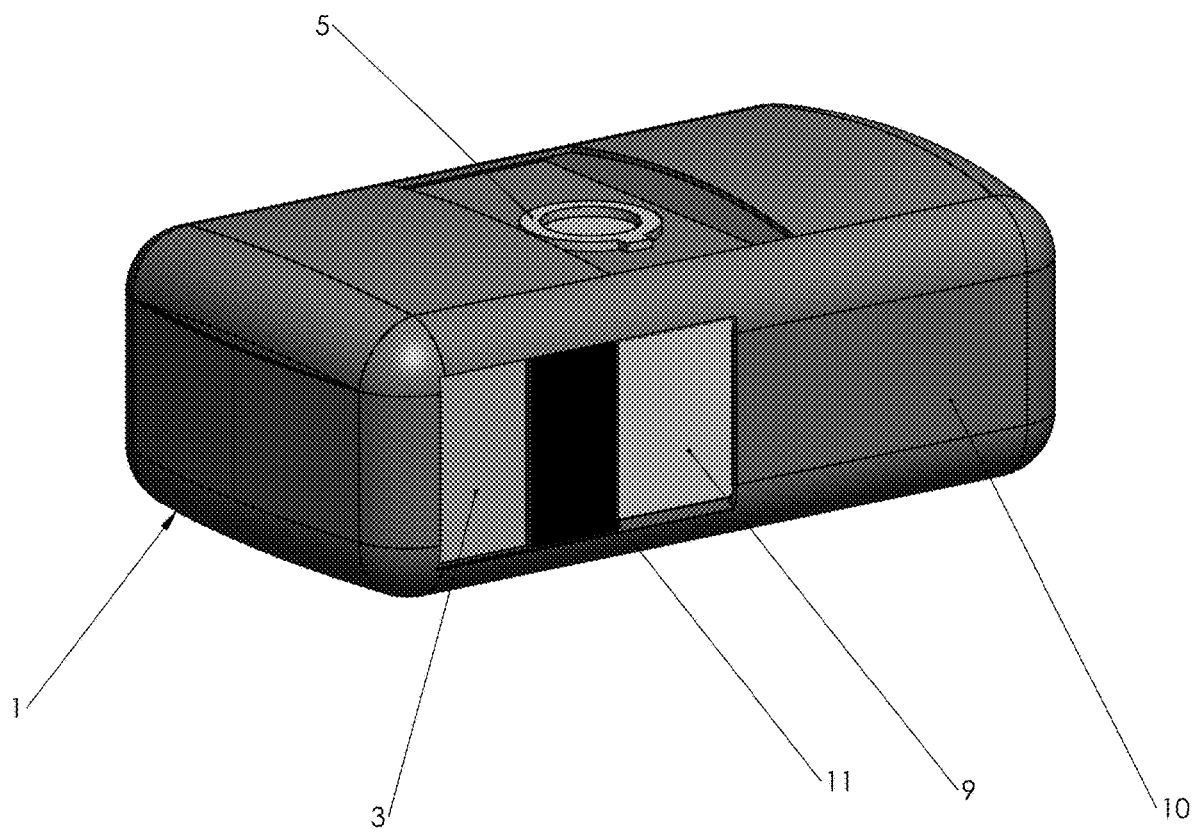
FIG. 5 is an isometric view of a self-sealing fuel tank according to another aspect of the present invention.

Referring to FIG. 5, the method further includes depositing and/or encapsulating an environmental layer 10 over at least a portion of the latex coating layer 9 (or barrier and/or strengthening layer, if present). The environmental layer 10 may be deposited over at least a portion of the external surfaces 3 and/or the internal surfaces 4, depending on which surfaces the swellable latex coating layer 9 was deposited over. The environmental layer 10 may encapsulate at least a portion of the latex coating layer 9 by forming preformed layers that are cut to the shape of the container 1 and affixed to at least a portion of the latex coating layer 9 (or barrier and/or strengthening layer, if present). The environmental layer 10 may be used to protect the surrounding environment from exposure to the underlying coating layers.

The environmental layer 10 may be deposited using any technique known in the art. For example, the environmental layer 10 may be applied in the form of an environmental coating composition and subsequently cured to form the environmental layer 10. The environmental coating composition may be sprayed, casted, and/or affixed as preformed layers over the latex coating layer 9. The environmental coating composition may be cured to form the environmental layer 10 at ambient conditions for greater than 1 hour, or greater than 2 hours, or greater than 4 hours, or for greater than 8 hours, or greater than 12 hours. Alternatively, the environmental coating composition may be cured at elevated conditions.

The environmental coating composition may comprise a preformed polymer shape. For example, the environmental coating composition may comprise a thermoplastic polymer, a thermoset polymer, or a combination thereof. As used herein, a "thermoplastic" polymer is a polymer that softens when heated and may be reformed. As used herein, a "thermoset" polymer is a polymer that is irreversibly hardened by curing that prevents said polymer from softening and being reshaped. The environmental coating composition may comprise a polymer such as a polyurethane, an epoxy resin, a polyolefin such as polyethylene, polypropylene, and the like, a (meth)acrylate polymer, or a combination thereof. The environmental coating composition may include additional components, such as pigments, gelling agents, foaming agents, and combinations thereof. In one non-limiting embodiment, the environmental coating composition comprises a polyurethane polymer. In another non-limiting embodiment, the environmental coating composition comprises polyethylene.

The environmental coating composition may be deposited directly over at least a portion of the swellable latex coating layer 9, such that the environmental layer 10 is in direct contact with the swellable latex coating layer 9. In addition to serving as a protective layer for the swellable latex coating layer 9, the environmental layer 10 provides increased sealing function in concert with the swellable latex coating layer 9 and mechanical stability in operation. When applied to the swellable latex coating layer 9, the environmental coating composition mechanically bonds to the swellable latex coating layer 9. When the container 1 is punctured, the environmental layer 10 adjacent to the punctured area may experience some degree of elastic deformation. Coupling the aforementioned expected elastic deformation of the environmental layer 10 with the mechanical bonding of the environmental layer 10 and the swellable latex coating layer 9 may promote increased septum properties of the environmental layer 10 and the swellable latex coating layer 9, resulting in additional hole-closure at the puncture area. As such, providing the environmental layer 10 in direct contact with the swellable latex coating layer 9 may provide an unexpected increase in septum properties that aids in closure of a puncture.

Additionally, the mechanical bonding of the environmental layer 10 to the swellable latex coating layer 9 aids in maintaining the position of the swellable material of the swellable latex coating layer 9 in the direction parallel to the external surfaces 3 and/or internal surfaces 4 of the container 1. During curing, the environmental layer 10 may slightly shrink to create a compression between the swellable latex coating layer 9 and the external surfaces 3 and/or internal surfaces 4 of the container 1. Due in part to the elastic modulus of the environmental layer 10, which is expected to be higher than that of the swellable material of the swellable latex coating layer 9, excessive swelling of the swellable latex coating layer 9 in a direction perpendicular to the external surfaces 3 and/or internal surfaces 4 of the container 1 is minimized, thereby allowing the swellable latex coating layer 9 to follow the path of least resistance during swelling (i.e., towards the puncture hole).

The method may optionally include depositing an adhesion promoter 11 over at least a portion of the external surfaces 3 and/or internal surfaces 4 of the container 1 prior to forming the latex coating layer 9. The adhesion promotor 11 may increase the adhesion of the latex coating composition 6 and resultant swellable latex coating layer 9 to the external surfaces 3 and/or internal surfaces 4 of the container 1. The adhesion promoter may include any adhesion promoter known in the art. Non-limiting examples of adhesion promoters include organosilanes, organotitanates, organozirconates, chlorinated polyolefins, silicone modified polyolefins, acrylic acid modified polyolefins, maleic anhydride modified polyolefins, metallic diacrylate, fatty esters, melamine cyanurate, and the like.

The latex coating layer 9 may be formed to repair a fuel tank. For example, a fuel tank that comprises one or more punctures may have the latex coating layer 9 formed over at least a portion of the internal surfaces 4 and/or external surfaces 3 of the container 1 to swell and seal said punctures when contacted with the fuel or seals said punctures via the septum properties of the latex coating layer 9.

Although various embodiments have been described herein, many modifications, variations, substitutions, changes, and equivalents to those embodiments may be implemented and will occur to those skilled in the art. It is therefore understood that the foregoing description and the appended claims are intended to cover all such modifications and variations as falling within the scope of the disclosed embodiments. The following claims are intended to cover all such modifications and variations.

What is claimed is:

1. A method of forming a self-sealing fuel tank, comprising:
    providing a container comprising internal surfaces and external surfaces and configured to hold a fuel; and
    forming a latex coating layer over at least a portion of the internal surfaces and/or external surfaces;
    wherein the latex coating layer swells when contacted with the fuel; and
    wherein the latex coating layer is formed from a latex coating composition that is substantially free of a non-ionic associative thickener.

2. The method of claim 1, wherein the latex coating layer has a density in the range of from 0.09 g/cc to 0.50 g/cc.

3. The method of claim 1, wherein the latex coating layer has a tensile strength in the range of from 20 psi to 200 psi.

4. The method of claim 1, wherein the forming step further comprises applying the latex coating composition onto at least a portion of the internal surfaces and/or the external surfaces, and curing the latex coating composition to form the latex coating layer.

5. The method of claim 1, further comprising depositing an adhesion promoter over at least a portion of the internal surfaces and/or external surfaces prior to forming the latex coating layer.

6. The method of claim 4, wherein the applying step comprises spraying, casting, rolling, brushing, and/or dipping the latex coating composition onto at least a portion of the external surfaces of the container.

7. The method of claim 4, wherein the applying step comprises spraying, casting, rolling, brushing, and/or dipping the latex coating composition onto at least a portion of the internal surfaces of the container.

8. The method of claim 1, further comprising compounding at least one latex polymer, an ionic gelling agent, and a foaming agent, to form the latex coating composition.

9. The method of claim 8, wherein the latex coating composition comprises:
from 40 to 70 weight % of the at least one latex polymer;
from greater than 0 to 20 weight % of the foaming agent; and
from greater than 0 to 10 weight % of the ionic gelling agent,
based on the total solids weight of the latex coating composition.

10. The method of claim 4, wherein the curing step comprises heating the latex coating composition to a temperature in the range of 60° C. to 95° C.

11. The method of claim 1, wherein the latex coating composition is a one-component coating composition.

12. A self-sealing fuel tank, comprising:
a container comprising internal surfaces and external surfaces and configured to hold a fuel; and
a latex coating layer over at least a portion of the internal surfaces and/or external surfaces;
wherein the latex coating layer swells when contacted with the fuel; and
wherein the latex coating layer is formed from a latex coating composition that is substantially free of a non-ionic associative thickener.

13. The self-sealing fuel tank of claim 12, further comprising an adhesion promoter over at least a portion of the internal surfaces and/or external surfaces and in between the portion of the internal surfaces and/or external surfaces and the latex coating layer.

14. The self-sealing fuel tank of claim 12, wherein the latex coating layer is over at least a portion of the internal surfaces.

15. The self-sealing fuel tank of claim 12, wherein the latex coating layer is over at least a portion of the external surfaces.

16. The self-sealing fuel tank of claim 12, wherein the container comprises a metal, a plastic, and/or a rubber.

17. The self-sealing fuel tank of claim 12, wherein the latex coating composition comprises at least one latex polymer, an ionic gelling agent, and a foaming agent.

18. The self-sealing fuel tank of claim 17, wherein the latex coating composition further comprises a colorant.

19. The self-sealing fuel tank of claim 12, wherein the latex coating composition is sprayed, casted, rolled, brushed and/or dipped onto at least a portion of the internal surfaces and/or the external surfaces.

20. The self-sealing fuel tank of claim 12, wherein the latex coating composition is a one-component coating composition.

* * * * *